(12) United States Patent
Murata et al.

(10) Patent No.: US 8,136,951 B2
(45) Date of Patent: Mar. 20, 2012

(54) PROJECTION TYPE DISPLAY APPARATUS AND OPTICAL UNIT WITH OPTICAL COUPLING LENS

(75) Inventors: Seiji Murata, Yokohama (JP); Satoshi Ouchi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 801 days.

(21) Appl. No.: 11/962,204

(22) Filed: Dec. 21, 2007

(65) Prior Publication Data

US 2008/0165329 A1 Jul. 10, 2008

(30) Foreign Application Priority Data

Jan. 5, 2007 (JP) ................................ 2007-000305

(51) Int. Cl.
*G03B 21/20* (2006.01)
*H04N 5/74* (2006.01)
(52) U.S. Cl. .............................. 353/94; 353/102; 353/20
(58) Field of Classification Search .................... 353/20, 353/33, 37, 57, 85, 81; 359/629, 636, 638, 359/640; 348/750, 757, 758
See application file for complete search history.

(56) References Cited

U.S. PATENT DOCUMENTS

| 2005/0122486 A1* | 6/2005 | Trollsch .......................... 353/94 |
| 2006/0023172 A1* | 2/2006 | Ikeda et al. ..................... 353/94 |
| 2006/0227300 A1* | 10/2006 | Drazic et al. ................... 353/84 |

FOREIGN PATENT DOCUMENTS

| JP | 8-36180 | 2/1996 |
| JP | 2002-31849 | 1/2002 |

* cited by examiner

*Primary Examiner* — Tony Ko
(74) *Attorney, Agent, or Firm* — Antonelli, Terry, Stout & Kraus, LLP.

(57) ABSTRACT

In a projection type display apparatus using plural light sources, an optical unit including plural light sources, a first collimator lens, an optical coupling lens, an image display element and a projection lens is formed, and in an optical path extending from the light sources to the projection lens, light is condensed only once on the image display element, thereby minimizing the number of optical parts used and shortening the length of the optical path from the plural light sources up to the projection lens to attain the reduction in size of the projection type display apparatus or the optical unit. In this way it is possible to provide a projection type display apparatus or an optical unit each capable of attaining the reduction of cost by minimizing the number of optical parts used and capable of attaining a high luminance by irradiating the image display element with the light emitted from the light sources without leakage of the light.

17 Claims, 7 Drawing Sheets 1a, 1b

4

PROJECTION TYPE DISPLAY APPARATUS AND OPTICAL UNIT WITH OPTICAL COUPLING LENS

CLAIMS OF PRIORITY

The present application claims priority from Japanese application serial no. JP2007-000305, filed on Jan. 5, 2007, the content of which is hereby incorporated by reference into this application.

BACKGROUND OF THE INVENTION

The present invention relates to a projection type display apparatus wherein an optical image formed on an image display element is projected on a larger scale onto a screw through a projection lens.

Heretofore, a projection type display apparatus for projecting an optical image formed on an image display element onto a screen or the like has been known and used practically. A liquid crystal panel or the like has recently been utilized as the image display element. To provide a brighter image, a technique of using plural light sources to improve the brightness is disclosed in JP-A-8-036180.

FIG. 7 illustrates a conventional optical unit. The optical unit includes a light source 51, a paraboloidal reflector 57, light transfer means 52, an image display element 53, a projection lens 54, and a UV-IR filter 55. The light source 51 emits light. The paraboloidal reflector 57 reflects light emitted from the light source 51. The light transfer means 52 irradiates an image display element 53 with light after emission and reflection from the light source 51 and the paraboloidal reflector 57. The image display element 53 forms an optical image. The projection lens 54 projects the optical image provided from the image display element 53 onto a screen (not shown). The UV-IR filter 55 cuts off ultraviolet and infrared rays would otherwise cause deterioration of optical elements.

First lenses $52a_1$ and $52a_2$ of the light transfer means 52 condense light emitted from light sources $51_1$ and $51_2$ to second lenses $52b_1$ and $52b_2$ to form light-source images in the vicinity of the second lenses $52b_1$ and $52b_2$. Light which has passed through the second lens 52b is condensed by an optical coupling lens 52c and is incident on a third lens 52d whose light ray angle is adjusted. The resulting light is then incident on the image display element 53.

In the optical unit shown in FIG. 7, the light emitted from the light source 51 is condensed at least twice by the second lens 52b and the third lens 52d, so that the optical path length thereof becomes long, giving rise to the problem of increase in size of the optical unit. Moreover, since the number of optical parts used is large, there arises the problem that the cost of the optical unit is high.

In FIG. 7, for example if a point light source not having a finite shape is disposed at a focal point of the paraboloidal reflector and emits light, the light emitted from the light source is reflected by the paraboloidal reflector and thereafter travels approximately in parallel. However, the light source 51 has a finite size and therefore, for example, light emitted from a position deviated from a focal point in the light source $51_1$ is not collimated but generates aberration, as indicated by a dotted line 60. As a result, for example, the light may directly enter the optical coupling lens 52c without being incident on the second lens $52b_1$ or may become incident on the second lens $52b_2$. Thus it becomes impossible to let light be incident on the image display element 53.

The present invention has been accomplished in view of the above-mentioned problems, and it is an object of the invention to provide a projection type display apparatus or an optical unit capable of attaining the reduction of cost by minimizing the number of optical parts and also capable of attaining a high luminance by irradiating an image display element with light emitted from a light source without leakage.

SUMMARY OF THE INVENTION

According to the present invention the size of a projection type display apparatus or an optical unit is reduced by forming an optical unit having plural light sources, a first collimator lens, an optical coupling lens, an image display unit and a projection lens, condensing light only once on the image display element and on an optical path extending from the light sources to the projection lens, thereby minimizing the number of optical parts used and shortening the length of the optical path extending from the light sources to the projection lens.

DESCRIPTION OF THE PREFERRED EMBODIMENTS

Figure 1:
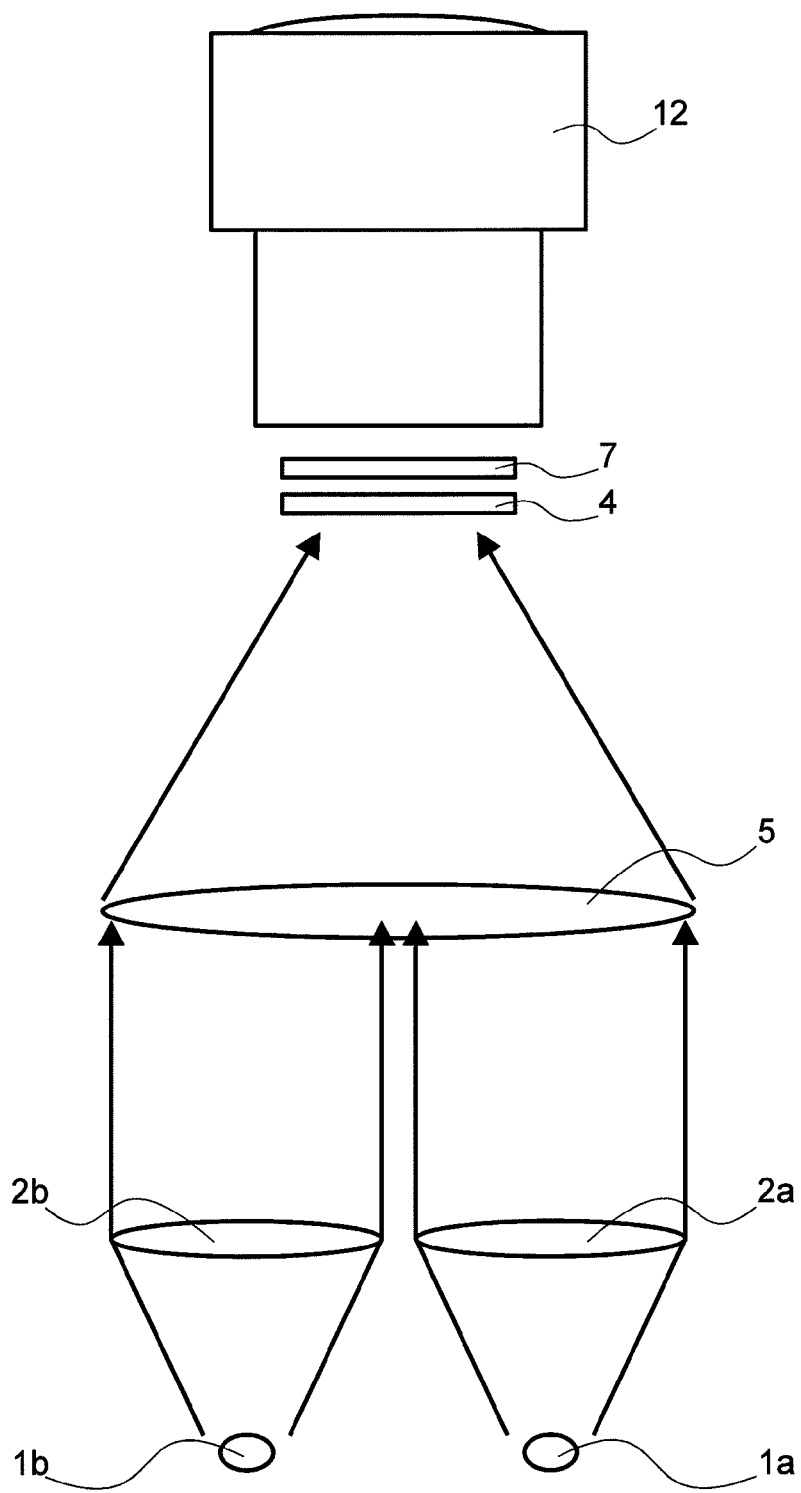
FIG. 1 illustrates an optical unit according to a first embodiment of the present invention.

Embodiments of the present invention will be described hereinunder with reference to the accompanying drawings. In the drawings, elements having a common function are identified by the same reference numerals, and a repeated explanation of elements once explained will be omitted.

First Embodiment

FIG. 1 illustrates an optical unit according to a first embodiment of the present invention. The reference numerals 1a and 1b each denote a light source, numerals 2a and 2b each denote a first collimator lens, 5 an optical coupling lens, 4 an image display element, 7 an output-side polarizing plate, and 12 a projection lens.

For example, an ultra-high pressure mercury vapor lamp, LED, or laser may be used as the light sources 1a and 1b. Though not shown, it goes without saying that there may be used a paraboloidal or elliptic reflector which reflects light emitted from the light source.

In this first embodiment a description will be given about the case where two light sources 1a and 1b are used.

The first collimator lenses 2a and 2b are disposed in association with the light sources 1a and 1b, respectively, to collimate the light emitted from the light sources 1.

The optical coupling lens 5 combines the light outputted from the first collimator lenses 2a and 2b and condenses it so as to irradiate the image display element 4.

The image display element 4 is a transmission type image display element and modulates the light having been collimated by the first collimator lens into an optical image corresponding to a video signal. When a liquid crystal panel is used for the image display element 4, it is necessary to provide the output-side polarizing plate 7 which absorbs or reflects unnecessary light. Although in this first embodiment the output-side polarizing plate 7 is disposed on the output side of the image display element, it is optional whether such a polarizing plate is to be disposed on only the incident side of the image display element or on both incident and output sides of the image display element. The projection lens 12 projects light from the image display element 4 onto a screen.

The first collimator lenses 2a and 2b are, for example, spherical lenses or free curved lenses and formed of glass or plastic material. It goes without saying that like the first collimator lenses the optical coupling lens 5 may be formed by a spherical lens or a free curved lens using glass or plastic material.

The first collimator lenses 2a and 2b are light imaging parts and form light source images of the light sources 1 onto the image display element. The light outgoing from the first collimator lenses 2 become substantially parallel light and is conducted to the image display element 4. In this case, by making it substantially parallel, it is possible to suppress light leaking from the effective area of the image display element 4 and thereby improve the utilization efficiency of light.

Although in this first embodiment a description has been given above about the case where two light sources 1a and 1b are used, it goes without saying that also in the case of using three or more light sources it is possible to obtain the same effect as in the first embodiment if the light sources are arranged symmetrically with respect to the optical axis of the optical coupling lens 5.

By being symmetric with respect to the optical axis of the optical coupling lens 5 or the image display element 4 or the projection lens 12 is meant that in the case where the number of the light sources 1 is two or more and is an even number, the light sources are arranged in such a manner that the centers of the light sources 1 and first collimator lenses 2a and 2b lie at vertices of a regular polygon whose center is positioned on the optical axis of the lens 5.

In the case where the number of the light sources 1 is an odd number, one of them is disposed on the optical axis of the optical coupling lens 5 and the others are arranged in the same manner as in the above even number case. By arranging light sources symmetrically with respect to the optical axis of the optical coupling lens 5 light source images are produced symmetrically with respect to the panel, so that it becomes possible to offset variations in luminance of the light sources 1 and attain uniform irradiation onto the image display element 4.

Figure 2A:
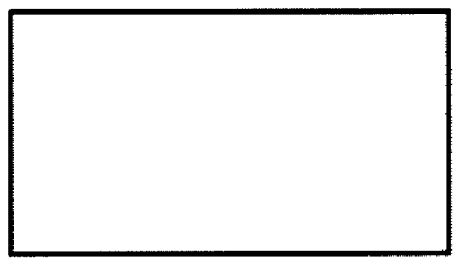
FIG. 2A is a front view of a surface illuminant.

As shown in FIG. 2A, the light sources 1a and 1b may be rectangular surface illuminants. By making the shape of the light sources 1a and 1b substantially analogous to an effective area 4a of the image display element 4 shown in FIG. 2B it is possible to suppress the loss of light protruding from the effective area 4a of the image display element 4 and improve the utilization efficiency of light.

Figure 2B:
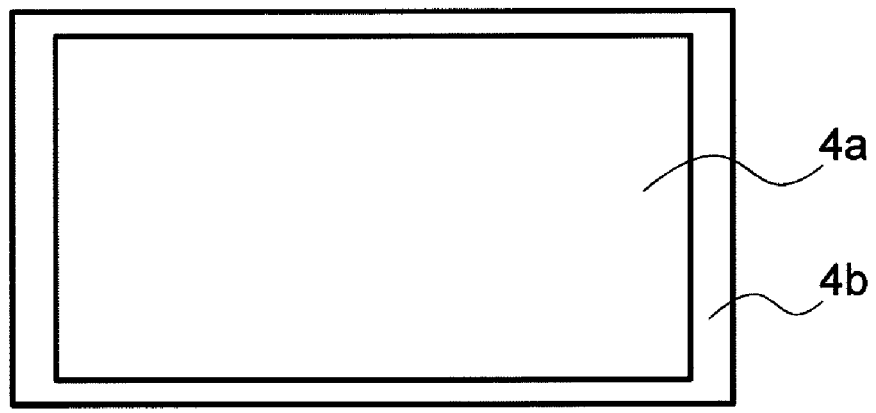
FIG. 2B is a front view showing an effective area and a margin of an image display element.

Moreover, as shown in FIG. 2B, when a margin 4b is to be taken for attaining satisfactory uniformity on the effective area 4a of the image display element 4, in addition to the effective area 4a, the light sources 1a and 1b are formed in a shape substantially analogous to the shape of the area including the margin 4b. This makes it possible to irradiate the effective area 4a of the image display element 4 with light without leakage of light and hence possible to improve the utilization efficiency of light.

Though not shown, an array lens group including first and second array lenses as integrators for making the illuminance of light uniform, a light pipe, and a polarization transducer for unifying the polarization direction, are disposed between the light sources 1 and the first collimator lenses 2a and 2b. This can improve the utilization efficiency of light in the image display element 4.

Thus, in this first embodiment, by forming an optical unit with use of the first collimator lenses 2a and 2b, optical coupling lens 5, image display element 4, output-side polarizing plate 4 and the projection lens 12, it is possible to minimize the number of optical parts used and attain the reduction of cost. Further, since light condensation on the optical path extending from the light sources 1 to the projection lens 12 is performed once on the image display element 4, it is possible to shorten the length of the optical path from the light sources 1 to the projection lens 12 and hence possible to reduce the size of the optical unit.

Second Embodiment

Figure 3:
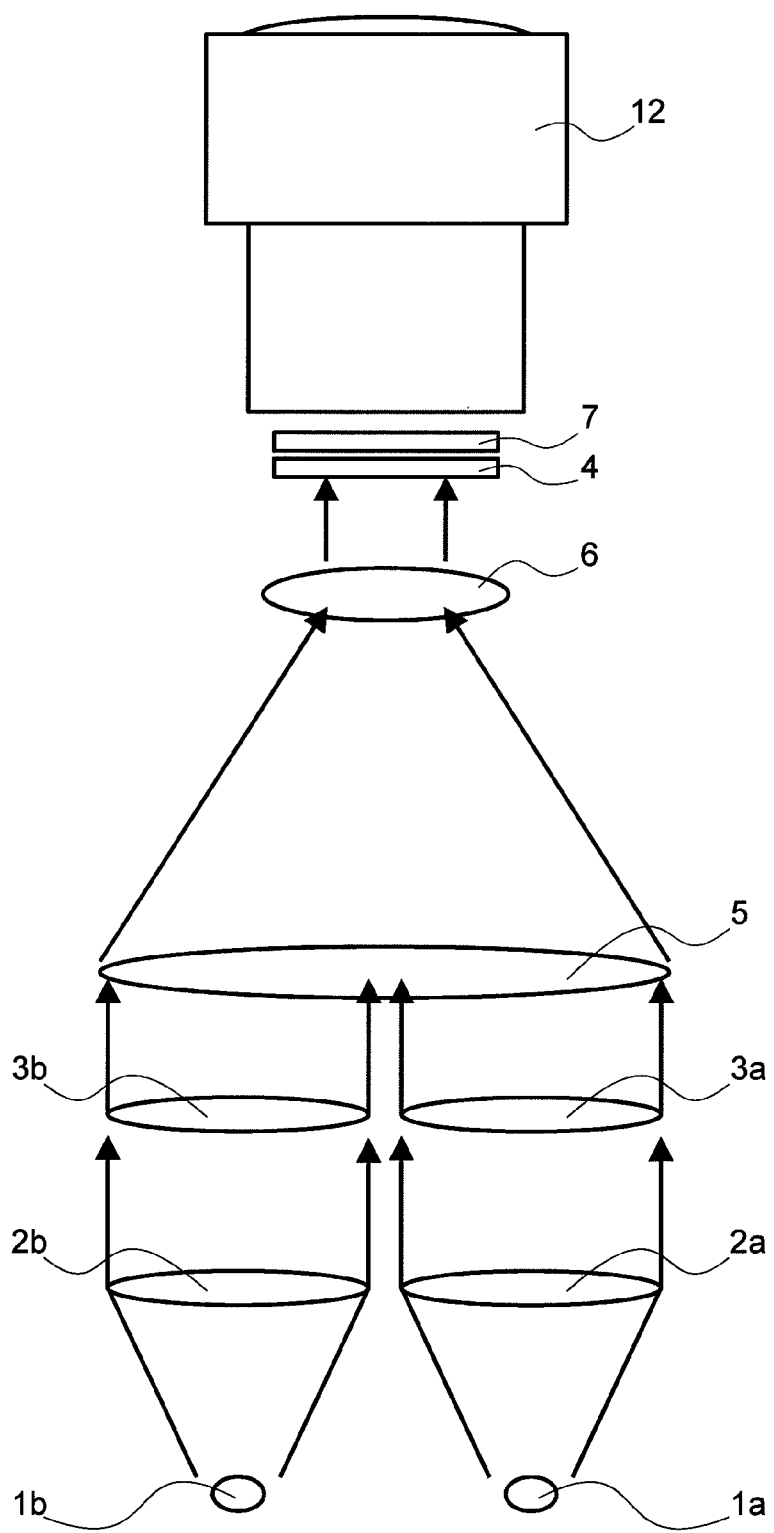
FIG. 3 illustrates an optical unit according to a second embodiment of the present invention.

FIG. 3 illustrates an optical unit according to a second embodiment of the present invention. In this second embodiment, explanations of the same points as in the first embodiment will be omitted for simplification of explanation.

In this second embodiment, the numerals 3a and 3b each denote a second collimator lens and numeral 6 denotes a condenser lens. Other optical parts are the same as in the first embodiment.

Similarly to the first collimator lenses 2a and 2b, second collimator lenses 3a and 3b are provided in association with the light sources 1a and 1b, respectively, and are disposed between the first collimator lenses 2a, 2b and the optical coupling lens 5. The second collimator lenses 3a and 3b further collimate the light having been collimated by the first collimator lenses 2a and 2b to suppress light leaking from the effective area of the image display element 4. This becomes possible to improve the utilization efficiency of light.

The condenser lens 6 is disposed between the optical coupling lens 5 and the image display element 4. The condenser lens 6 condenses light outgoing from the optical coupling lens 5, collimates it and irradiates the image display element 4 with the collimated light. In the previous first embodiment, the image display element 4 is directly irradiated with the light from the optical coupling lens 5, so that the light is incident obliquely on the image display element 4, with consequent possible output of unnecessary light from the image display element. On the other hand, in this second embodiment, since the image display element 4 is irradiated with collimated light by the condenser lens 6, with no output of unnecessary light, it is possible to improve the contrast.

Besides, similarly to the first collimator lenses 2a and 2b used in the first embodiment, the second collimator lenses 3a and 3b and the condenser lens 6 are, for example, spherical lenses or free curved lenses and are formed of, for example, glass or plastic material.

Thus, in this second embodiment, as compared with the first embodiment, since the light from the light sources 1 is condensed by the condenser lens 6, it is possible to prevent output of unnecessary light and consequently it becomes possible to improve the contrast of a displayed image.

Third Embodiment

Figure 4:
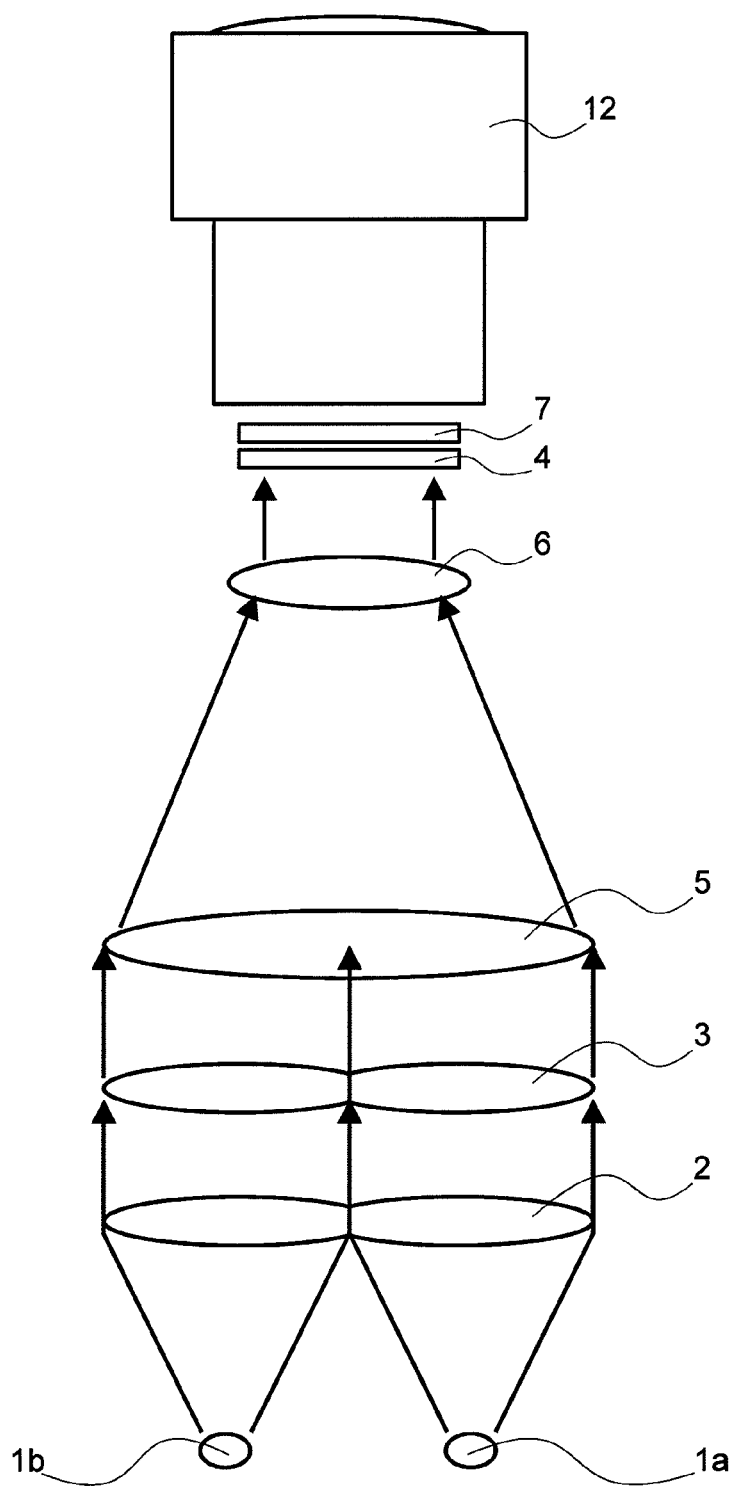
FIG. 4 illustrates an optical unit according to a third embodiment of the present invention.

FIG. 4 illustrates an optical unit according to a third embodiment of the present invention. In this third embodiment, explanations of the same points as in the second embodiment will be omitted for simplification of explanation.

In this third embodiment, the first collimator lenses 2a and 2b described in the second embodiment are united into a first collimator lens and likewise the second collimator lenses 3a and 3b are united into a second collimator lens. Other optical parts are the same as in the second embodiment.

In this third embodiment the first collimator lenses 3 are united to shorten the distance between the optical axis of the first collimator lens 2a and that of the first collimator lens 2b both described in the second embodiment. By approximating the optical axis of the first collimator lens 2a and that of the first collimator lens 2b to each other it becomes possible to draw the light sources 1a and 1b close to each other. Consequently, when the light emitted from the light sources 1 travels to the image display element 4, it is possible to suppress light protruding from the effective area of the image display element 4, thereby improving the utilization efficiency of light, and reduce the size of the optical unit. Moreover, by drawing the light sources 1a and 1b close to each other, the optical axis of the light source 1a and that of the light source 1b approach each other. Therefore, when light from the optical coupling lens 5 is condensed to the condenser lens 6, it is possible to make the light converging angle small in comparison with that in the first or the second embodiment and unnecessary light is not outputted from the image display element 4, thus making it possible to improve the contrast of a displayed image. Further, it goes without saying that the same effects as above are obtained by uniting the second collimator lenses 3a and 3b.

Of course, even if the first collimator lenses 2a and 2b are united in the first embodiment, the same effects as above will be obtained.

Fourth Embodiment

Figure 5:
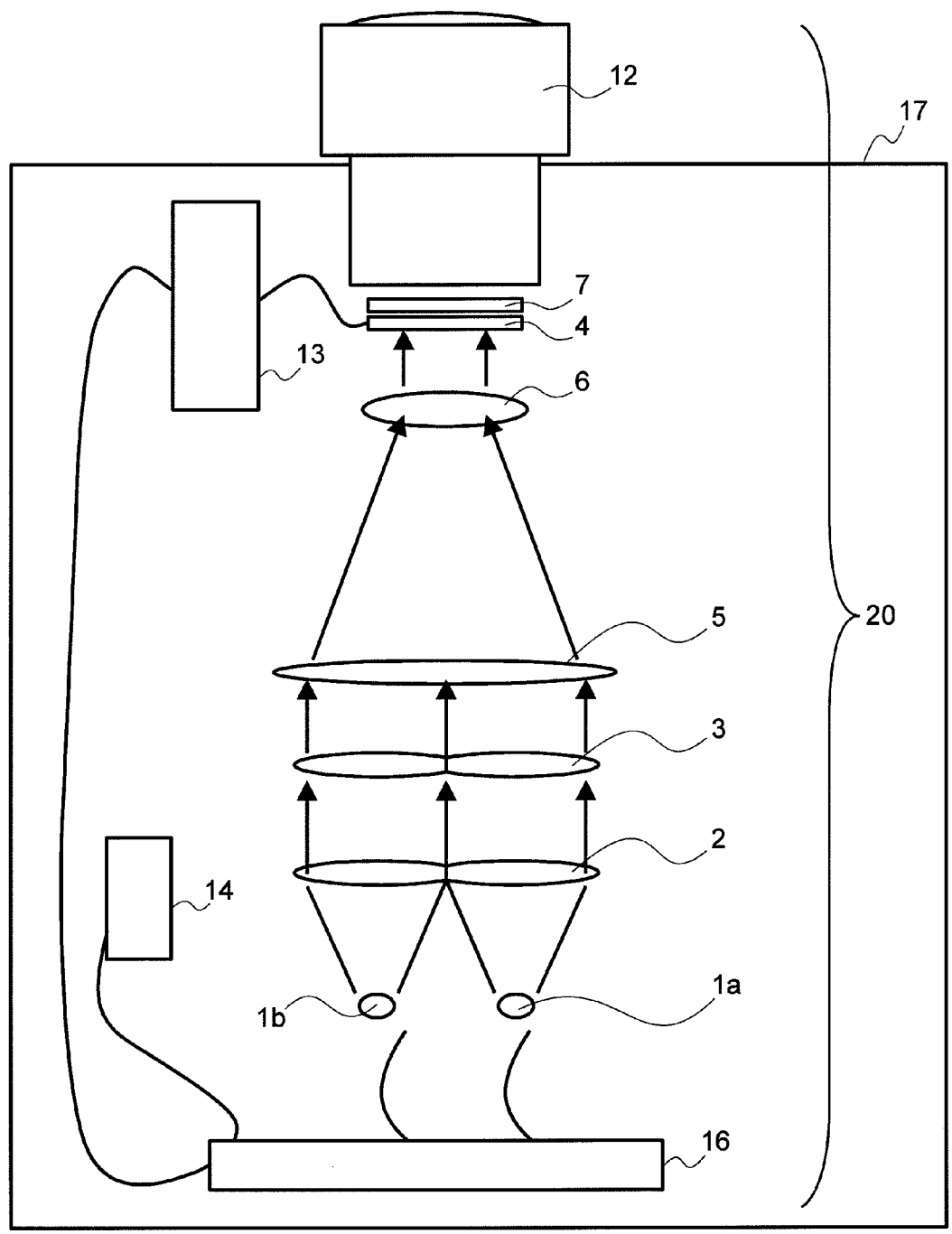
FIG. 5 illustrates a projection type display apparatus according to a fourth embodiment of the present invention.

FIG. 5 illustrates a projection type display apparatus according to a fourth embodiment of the present invention. The projection type display apparatus of this fourth embodiment is provided with the optical unit of the third embodiment. In this fourth embodiment, explanations of the same points as in the third embodiment will be omitted for simplification of explanation.

The projection type display apparatus of this fourth embodiment includes a drive section 13 for generating a drive signal corresponding to a video signal, a cooler 14, a power supply section 16 for the supply of electric power to both drive section 13 and cooler 14, and a housing 17 which houses those constituent members therein.

Although the projection type display apparatus of this fourth embodiment described above is provided with the optical unit of the third embodiment, it goes without saying that the optical unit may be substituted by the optical unit of the first or the second embodiment.

Fifth Embodiment

Figure 6:
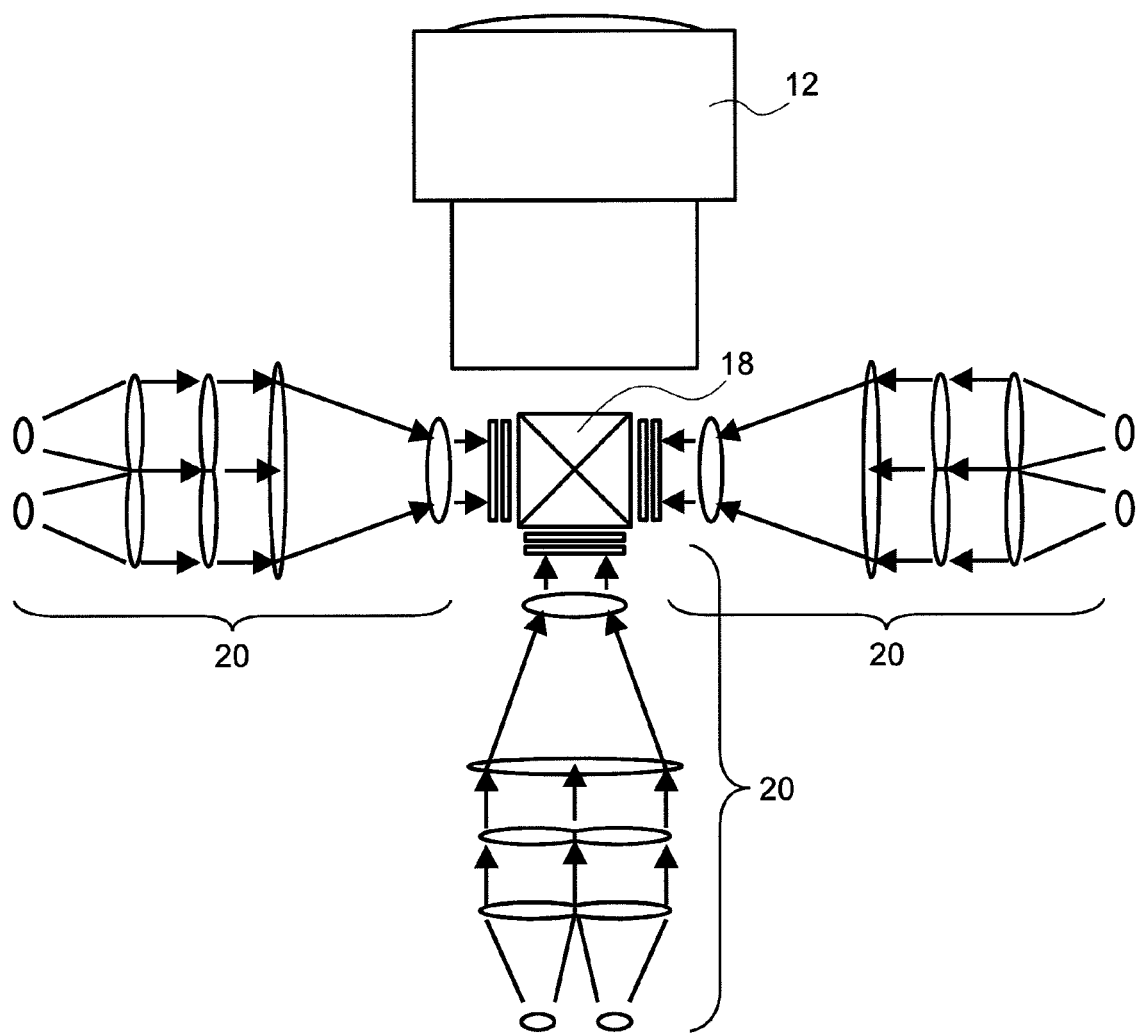
FIG. 6 illustrates a projection type display apparatus according to a fifth embodiment of the present invention.
Figure 7:
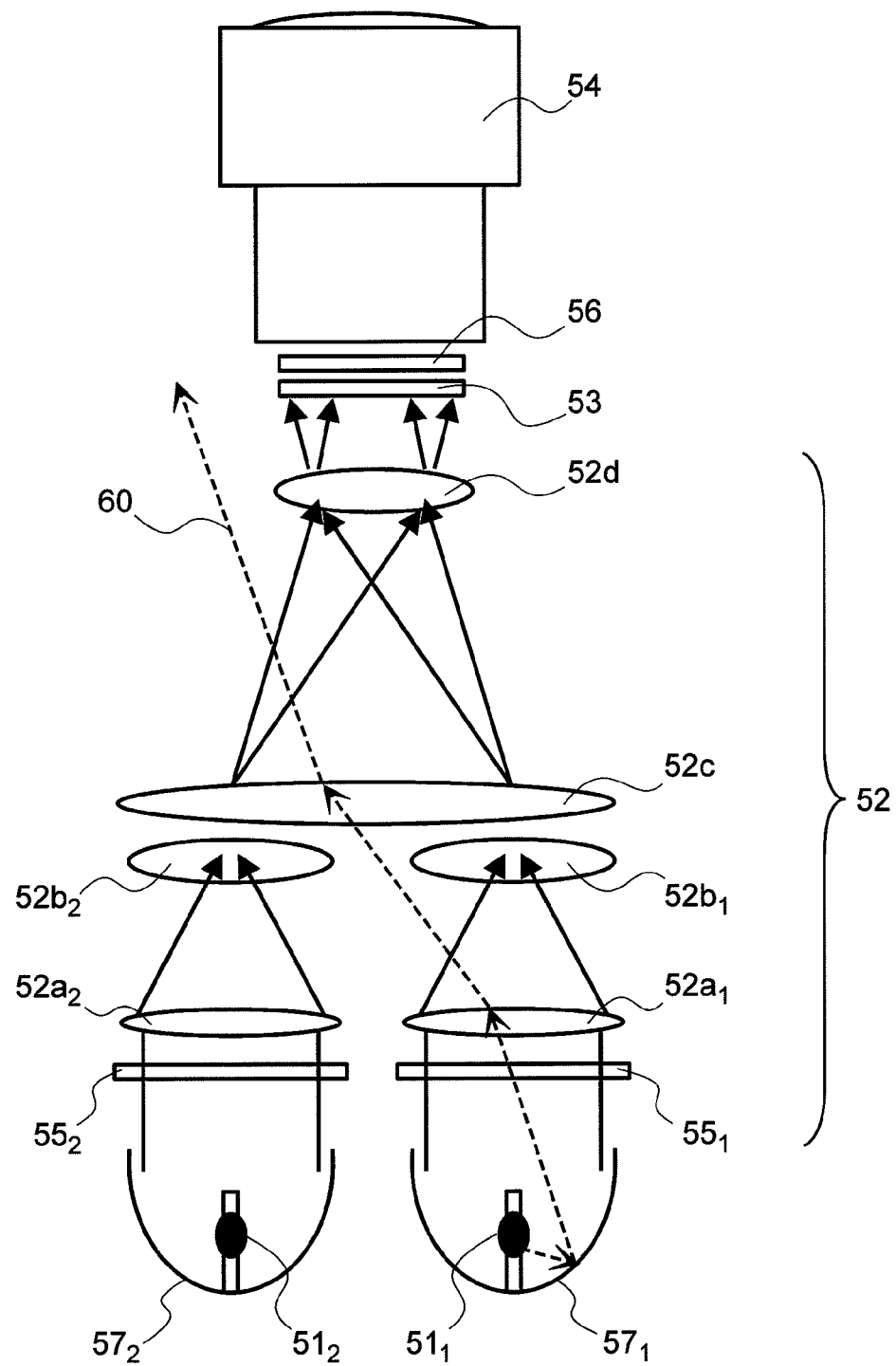
FIG. 7 illustrates a conventional optical system.

FIG. 6 illustrates a projection type display apparatus according to a fifth embodiment of the present invention. The projection type display apparatus of this fifth embodiment is provided with the optical unit of the third embodiment in a plural number. In this fifth embodiment, explanations of the same points as in the third embodiment will be omitted for simplification of explanation.

The projection type display apparatus of this fifth embodiment has plural optical units 20 of the third embodiment. Light emitted from the light sources 1 is conducted to the image display element 4 to obtain an optical image. The optical units 20 are respectively provided with light sources which emit different colors. The drive section drives the image display elements 4 of the optical units so that the image display elements go on in different colors, affording optical images corresponding to the lit colors. The optical images from the optical units 20 are combined in a color combining section 18 and the resulting optical image is projected by the projection lens 12.

Although the projection display system of this fifth embodiment is provided with the optical unit of the third embodiment, it goes without saying that the optical unit may be substituted by the optical unit of the first or the second embodiment.

Although the image display element described in the above embodiments is a transmission type image display element, it goes without saying that the image display element may be substituted by a reflection type image display element, e.g., DMD (Digital Micromirror Device).

The invention claimed is:

1. A projection type display apparatus comprising:
a plurality of surface light sources for emitting light;
a plurality of first collimator lenses for collimating the light emitted from said plural surface light sources, said plural first collimator lenses being disposed in association with said plural light sources respectively;
an optical coupling lens for combining and condensing parallel lights, each of which is outputted from corresponding each of said plural first collimator lenses;
an image display element disposed at a position where the light outgoing from said optical coupling lens is condensed, said image display element modulating the light outgoing from said optical coupling lens into an optical image corresponding to a video signal;
a projection lens for projecting the optical image formed by said image display element; and
a drive section for driving said image display element.

2. A projection type display apparatus according to claim 1, wherein each of said plural light sources is formed in a surface shape substantially analogous to the shape of said image display element.

3. A projection type display apparatus according to claim 1, wherein the number of said plural light sources is an even number and the even number of the light sources are arranged so as to be symmetric with respect to an optical axis of said projection lens.

4. A projection type display apparatus according to claim 1, wherein the number of said plural light sources is an odd number, one of said plural light sources is disposed on an optical axis of said projection lens, and said plural light sources other than the one disposed on the optical axis of the projection lens are arranged so as to be symmetric with respect to the optical axis of the projection lens.

5. A projection type display apparatus according to claim 1, wherein each of said plural light sources is a laser or an LED.

6. A projection type display apparatus according to claim 1, further comprising second collimator lenses, said second collimator lenses being disposed between said first collimator lenses and said optical coupling lens in association with the first collimator lenses respectively.

7. A projection type display apparatus according to claim 6, wherein said plural second collimator lenses are formed in a united shape.

8. A projection type display apparatus according to claim 1, wherein said plural first collimator lenses are formed in a united shape.

9. A projection type display apparatus comprising:
a plurality of surface light sources for emitting light;
a plurality of first collimator lenses for collimating the light emitted from said plural surface light sources, said plural first collimator lenses being disposed in association with said plural light sources respectively;

an optical coupling lens for combining and condensing parallel lights, each of which is outputted from corresponding each of said plural first collimator lenses;

a condenser lens for condensing the light outgoing from said optical coupling lens, collimating the condensed light and irradiating an image display element with the collimated light;

said image display element modulating the light outgoing from said condenser lens into an optical image corresponding to a video signal;

a projection lens for projecting the optical image formed by said image display element; and a drive section for driving said image display element.

10. A projection type display apparatus according to claim 9, wherein each of said plural light sources is formed in a surface shape substantially analogous to the shape of said image display element.

11. A projection type display apparatus according to claim 9, wherein the number of said plural light sources is an even number and the even number of the light sources are arranged so as to be symmetric with respect to an optical axis of said projection lens.

12. A projection type display apparatus according to claim 9, wherein the number of said plural light sources is an odd number, one of said plural light sources is disposed on an optical axis of said projection lens, and said plural light sources other than the one disposed on the optical axis of the projection lens are arranged so as to be symmetric with respect to the optical axis of the projection lens.

13. A projection type display apparatus according to claim 9, wherein each of said plural light sources is a laser or an LED.

14. A projection type display apparatus according to claim 9, further comprising second collimator lenses, said second collimator lenses being disposed between said first collimator lenses and said optical coupling lens in association with the first collimator lenses respectively.

15. A projection type display apparatus according to claim 14, wherein said plural second collimator lenses are formed in a united shape.

16. A projection type display apparatus according to claim 9, wherein said plural first collimator lenses are formed in a united shape.

17. An optical unit comprising:

a plurality of surface light sources for emitting light;

a plurality of first collimator lenses for collimating the light emitted from said plural surface light sources, said plural first collimator lenses being disposed in association with said plural light sources respectively;

an optical coupling lens for combining and condensing parallel lights, each of which is outputted from corresponding each of said plural first collimator lenses;

an image display element disposed at a position where the light outgoing from said optical coupling lens is condensed, said image display element modulating the light outgoing from said optical coupling lens into an optical image corresponding to a video signal; and a projection lens for projecting the optical image formed by said image display element.

* * * * *